United States Patent [19]

Halley

[11] Patent Number: 5,288,266

[45] Date of Patent: Feb. 22, 1994

[54] STORAGE VESSEL

[75] Inventor: David Halley, Livingston, Scotland

[73] Assignee: W. L. Gore & Associates, (UK) Ltd., London, United Kingdom

[21] Appl. No.: 900,039

[22] Filed: Jun. 17, 1992

[30] Foreign Application Priority Data

| Jun. 18, 1991 | [GB] | United Kingdom | 9113087 |
| Aug. 23, 1991 | [GB] | United Kingdom | 9118239 |
| Mar. 18, 1992 | [GB] | United Kingdom | 9205837 |

[51] Int. Cl.$^5$ .................... A01F 25/14; A01F 25/22; F26B 21/02
[52] U.S. Cl. .................... 454/182; 52/3; 52/23; 428/422; 454/174; 206/524.2; 206/813
[58] Field of Search .................. 52/3, 23; 428/422; 206/484, 484.2, 524.9, 213.1, 524.8, 524.2; 454/173, 174, 182

[56] References Cited

U.S. PATENT DOCUMENTS

| 1,473,845 | 11/1923 | Gardon | 52/2.11 |
| 1,788,985 | 1/1931 | Connolly | 454/174 X |
| 2,895,400 | 7/1959 | Topf | 454/182 |
| 3,103,083 | 9/1963 | Seeger | 52/3 |
| 3,140,161 | 7/1964 | Poynor et al. | 454/174 X |
| 3,539,057 | 11/1970 | Bronner | 52/2.14 |
| 3,727,656 | 4/1973 | Luders | 52/3 X |
| 3,783,766 | 1/1974 | Boucher | 454/173 |
| 3,828,501 | 8/1974 | Haskins | 52/23 X |
| 3,929,178 | 12/1975 | Hickey | 206/524.8 |
| 3,953,566 | 4/1976 | Gore | 428/422 X |
| 4,114,668 | 9/1978 | Hickey | 206/524.8 |
| 4,121,389 | 10/1978 | Ptaszek | 52/224 |
| 4,122,637 | 10/1978 | Runge et al. | 52/3 |
| 4,194,041 | 3/1980 | Gore et al. | 428/422 X |
| 4,261,401 | 4/1981 | Hickey | 206/524.8 X |
| 4,455,790 | 6/1984 | Curle | 52/4 |
| 4,484,420 | 11/1984 | Stokes | 52/3 X |
| 4,493,248 | 1/1985 | Wolstenholme | 454/182 |
| 4,532,316 | 7/1985 | Henn | 428/423.1 |
| 4,660,337 | 4/1987 | Ross, III et al. | 52/3 |
| 4,916,017 | 4/1990 | Nomi et al. | 428/422 |
| 4,989,363 | 2/1991 | Doernemann | . |
| 5,104,727 | 4/1992 | Wnenchak | 428/422 X |

FOREIGN PATENT DOCUMENTS

| 0223567 | 5/1987 | European Pat. Off. . |
| 0335682 | 10/1989 | European Pat. Off. . |
| 2517279 | 11/1981 | France . |
| 2495661 | 6/1982 | France ...................... 52/3 |
| 8907568 | 8/1989 | PCT Int'l Appl. . |
| 1207966 | 10/1970 | United Kingdom . |
| 2112441 | 7/1983 | United Kingdom . |
| 2211132 | 6/1989 | United Kingdom . |

OTHER PUBLICATIONS

Abstract of EP 380830 Jan. 1989.
Abstract of EP 380319 Aug. 1990.
Abstract of EP 377593 Jul. 1987.
Abstract of EP 370802 Nov. 1988.
Abstract of EP 366254 Sep. 1988.
Abstract of EP 345812 Jun. 1988.
Abstract of EP 335520 Jan. 1989.
Abstract of EP 229550 Dec. 1985.
Abstract of EP 206343 Dec. 1985.
Abstract of EP 179460 Oct. 1984.
Abstract of EP 151489 May 1984.
Abstract of EP 83826 Jan. 1982.
Abstract of EP 4073 Aug. 1978.
Abstract of EP 3903 Aug. 1978.
Abstract of GB 2237553 May 1991.

(List continued on next page.)

Primary Examiner—William I. Price
Attorney, Agent, or Firm—Gary A. Samuels

[57] ABSTRACT

A storage vessel for storing grain or other natural products comprises a gas-impermeable enclosure having a water-vapour-permeable membrane to allow the grain to breath and dry, and to prevent condensation and mould growth. The membrane is impermeable to oxygen gas to allow a reduced oxygen atmosphere (e.g. 3 to 7%) to be established as oxygen is used up by insect pests within the grain. The insects are unable to survive at such low levels of oxygen. Thus the grain is protected against pests without the use of chemical pesticides.

14 Claims, 5 Drawing Sheets

U.S. PATENT DOCUMENTS

Abstract of GB 1512050 Sep. 1975.
Abstract of GB 1069929 May 1965.
Abstract of US 3,646,874 Nov. 1969.
Abstract of WO 90/11234 Oct. 1990.
Abstract of WO 90/08636 Aug. 1990.
Abstract of WO 90/00504 Jan. 1990.
Abstract of 89/08557 Sep. 1989.
Abstract of 89/02861 Apr. 1989.
AU 595007, Specification, "Laminates and Laminated Articles", Feb. 25, 1986.
Abstract of: DE 3531-808-A Mar. 1987.
Abstract of: DE 3720-771-A Jun. 1987.

Abstract of: FR 2490-076 Sep. 1980.
Abstract of: FR 2507-161 Jun. 1981.
Abstract of: 2531-042 Jul. 1982.
Abstract of WO 87/05885 Oct. 1987.
Abstract of: DE 3708-950 Sep. 1988.
Abstract of: JP 60-49741, Mar. 19, 1985.
Abstract of: JP 63-258, Jan. 5, 1988.
Abstract of: JP 63-119647, May 24, 1988.
Abstract of: JP 01-132334, May 24, 1989.
Abstract of: JP 02-119719, May 7, 1990.
Abstract of: JP 02-303409, Dec. 17, 1990.
Abstract of: JP 55-71444, May 29, 1980.
Abstract of: JP 55-74749, Jun. 5, 1980.
Abstract of: JP 63-294386, Dec. 1, 1988.

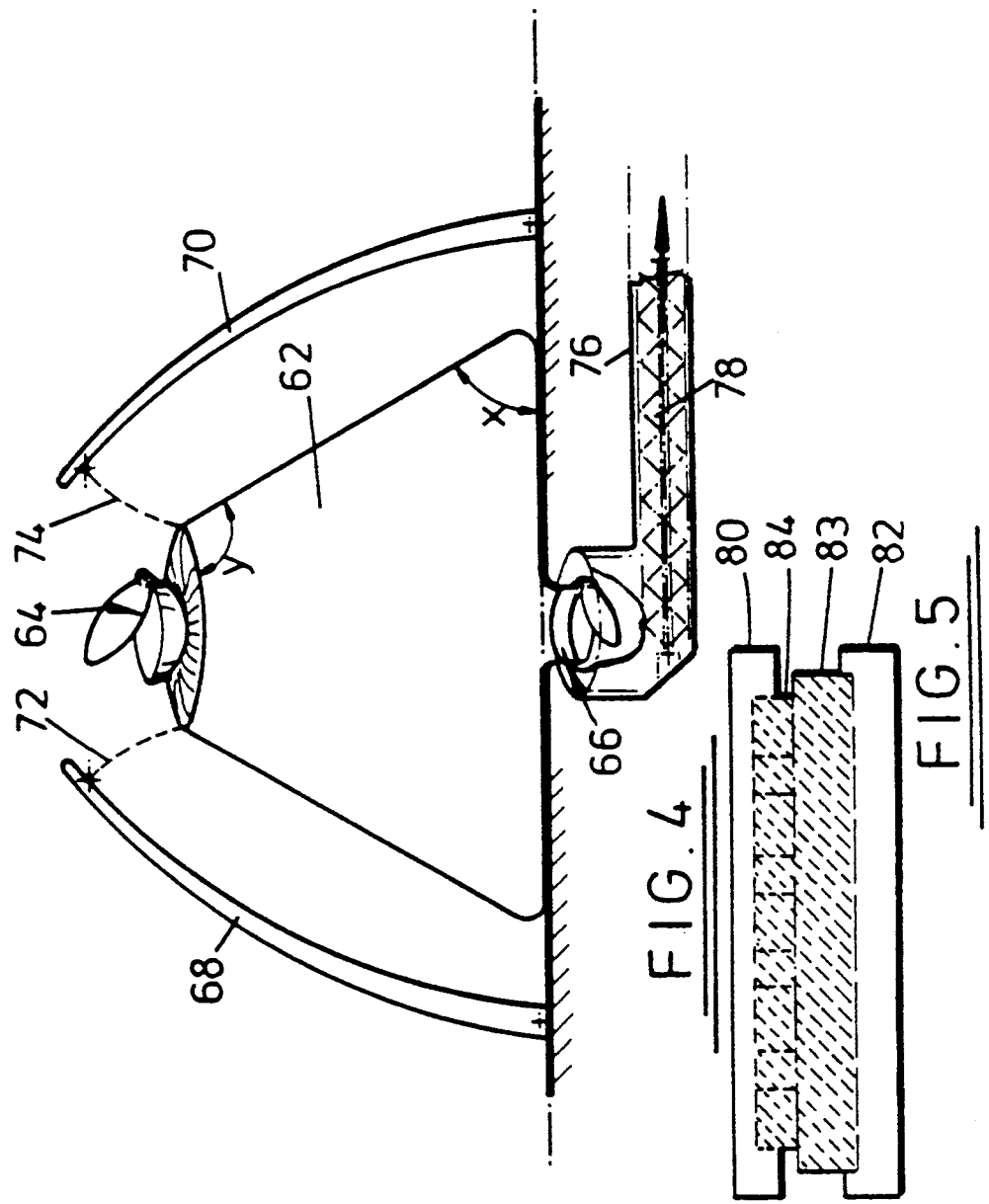

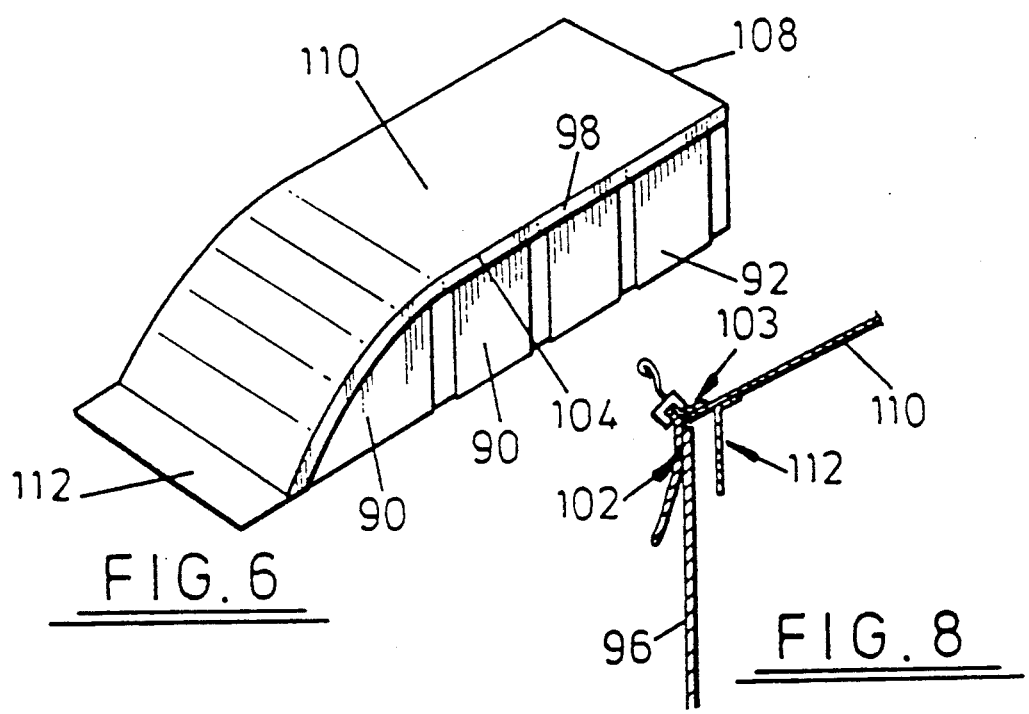
FIG. 6
FIG. 8
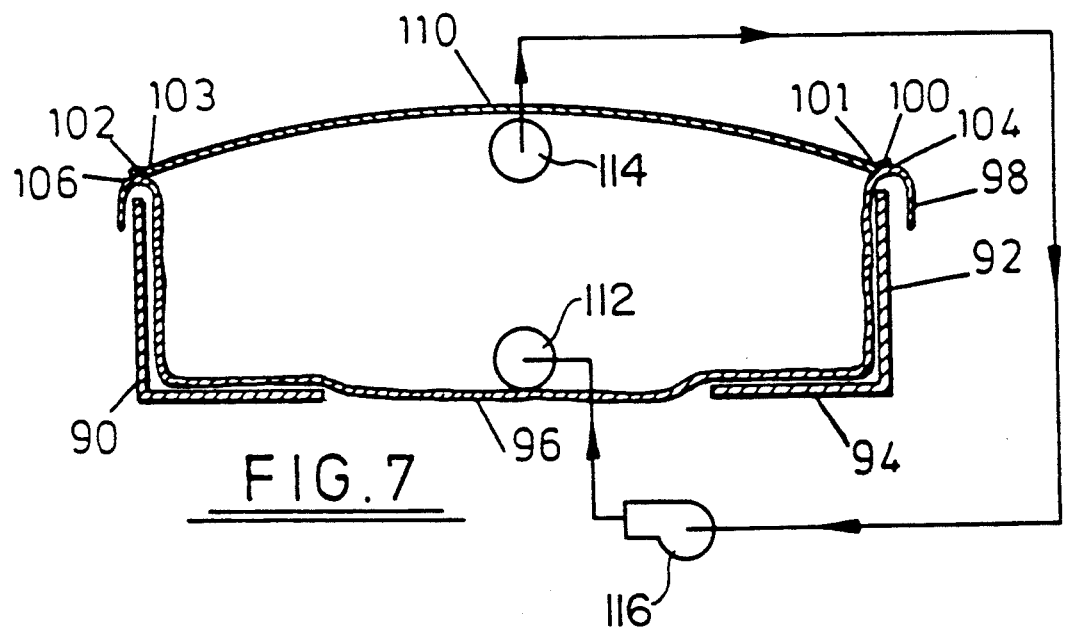
FIG. 7

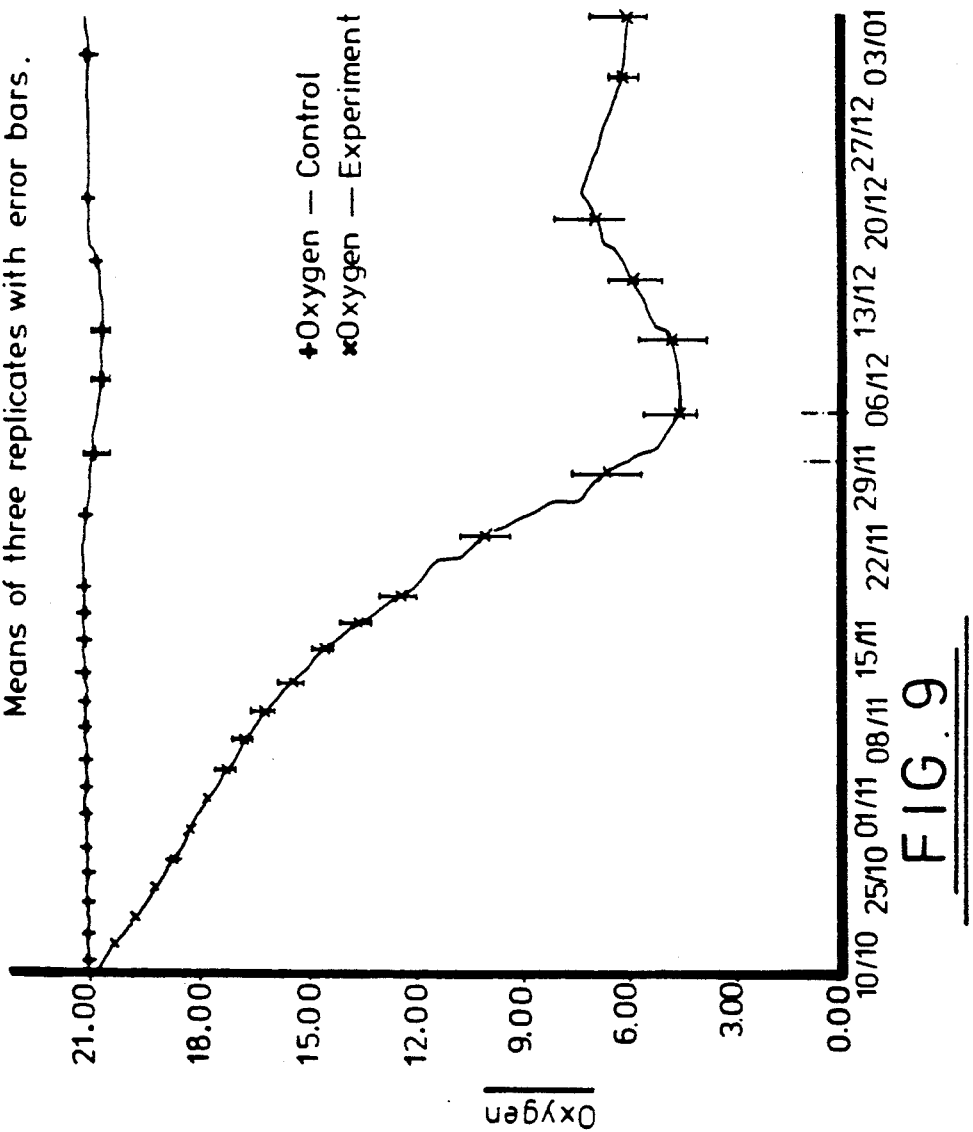

STORAGE VESSEL

FIELD OF THE INVENTION

The present invention relates to a store for storing products in a controlled environment which resists the ingress of gas from the external atmosphere. The store is particularly useful for storing perishable natural products (especially cellulosic products) such as agricultural products (e.g. crops, cereals or vegetables) and timber products.

BACKGROUND OF THE INVENTION

Conventionally, cereal crops, such as wheat, barley or other grains, are stored in silos awaiting use or shipment. Prior to storage, the moisture content is generally reduced to around 15% to avoid fungal growth. In order to protect against attack by insects, the grain may be sprayed with insecticide as it enters the storage silo or may be fumigated therein. However, the use of insecticides is undesirable in view of the possibility of residues remaining on the grain.

It is an object of the present invention to provide a store construction which is practical to use and mitigates these problems.

SUMMARY OF THE INVENTION

One aspect of the present invention provides a storage vessel for storing product in a controlled environment, which comprises;
- a gas-impermeable enclosure for storing the product, and comprising a water-vapour-permeable and gas-impermeable membrane;
- the enclosure having means for providing an upstanding wall and a sealable inlet for introducing the product.

The use of a water-vapour-permeable and gas-impermeable membrane to form an enclosure for storing the product allows for the transfer of water vapour from the inside of the enclosure, yet substantially prevents the ingress of oxygen. The water-vapour-permeable characteristic of the membrane allows the product to dry and prevents sweating. The gas-impermeability allows a reduced oxygen concentration to be maintained in the enclosure. Any insect or other pests present will begin to use up the available oxygen until substantially anaerobic conditions are attained beyond which such life forms cannot reproduce or even survive.

The invention also relates to a corresponding storing process.

DESCRIPTION OF PREFERRED EMBODIMENTS

The enclosure may include a groundsheet formed of a conventional waterproof material, which is impermeable to liquid water and water vapour as well as being gas-impermeable.

The gas-impermeable membrane is permeable to water vapour so as to allow the product to be dried (optionally by the use of heat or warm dry gas) and to prevent the build-up of condensation as the ambient temperature fluctuates. The flexible membrane is preferably formed of porous expanded polytetrafluoroethylene (PTFE), which may be produced as described in U.S. Pat. No. 3,953,566. The membrane may be coated with an oleophobic coating such as described in U.S. Pat. No. 4,194,041 to prevent wetting out of the membrane by oils or fats present in the product. Finally, the PTFE membrane may be supported on a backing material such as a woven or non-woven natural or artificial textile material known in the art to be suitable for the purpose, in order to provide adequate mechanical strength. However, other water-vapour-permeable gas-impermeable materials known in the art, such as polyurethanes, may also be used.

In a preferred construction, the membrane is formed of a laminate comprising porous expanded PTFE having an oleophobic coating thereon, and a further layer of porous expanded PTFE adhered by means of an adhesive over the oleophobic coating. The oleophobic layer is gas-impermeable but water-vapour-permeable. The adhesive layer is preferably formed of a breathable compound which is water-vapour-permeable and gas-impermeable, and which is applied as described for example in our U.S. Pat. No. 4,532,316.

The membrane usually has a water-vapour-permeability of at least 1500, for example 1500 to 35,000 (preferably 3000 to 10,000) $g/m^2/day$; and will be chosen according to the dampness of the product and the surface to volume ratio of the store. The oxygen leakage rate is preferably less than 0.05% per day so as to enable an oxygen concentration as low as 3 to 7% to be achieved. Generally the ratio of gas permeability: water-vapour-permeability will be in the region $1 \times 10^{-4}$ to $1 \times 10^{-6}$, particularly $5 \times 10^{-4}$ to $2 \times 10^{-5}$. Usually there is a relationship between water-vapour-permeability and gas permeability so that where a high water-vapour-permeability is needed for quick drying, a higher gas permeability has to be tolerated.

The vessel may comprise a support means, such as a frame structure. The enclosure may also be provided as a liner within conventional silo structures, such as those formed of perforated metal, or concrete. Equally, the enclosure may be on a smaller scale, for example in the form of sacks.

In the case of a permanent or semi-permanent arrangement, the enclosure would also normally be provided with an outlet for removing the stored product, normally at the base of the vessel, and might be provided with an auger for transporting the product.

The wall means may be any longitudinally extending structure of appropriate height, such as a beam formed of metal (for example an I-beam), a series of upstanding metal plates, or a solid material such as concrete. The structure may have been treated to be gas-impermeable. Alternatively, a groundsheet as described above may extend up the wall structure and be connected directly to the water-vapour-permeable membrane in gas-tight manner, e.g. by a zip fastener.

The wall means may include a longitudinally extending gas-impermeable hollow wall element provided with a port for filling with a weighting material. The wall element may have connection means for connecting the element end-to-end to another such element, and may comprise attachment means extending along an upper side thereof for attaching a membrane thereto in gas-type manner.

The hollow wall element is preferably formed of a fibrous material (such as cardboard, paperboard or fibre board) which has been impregnated with resin, moulded and cured to give a rigid shape; and also gas-impermeability. Fibre-reinforced materials such as fibreglass, or ceramic or carbon composites may also be used. Such a wall element is easily transported. When in position, the element may be filled with a weighting material, such as water, sand, gravel etc. which helps keep the wall in place.

The wall element may be square or circular in cross-section, but is preferably of triangular cross-section for stability. Also, a triangular cross-section (which may be equilateral or non-equilateral) provides an internal inclined surface down which the product slides when the store is being emptied. For this reason, at least one of the external surfaces of the wall element is preferably smooth.

Connection means may be provided for connecting two or more elements end-to-end such as to form a wall of the store. This may be achieved by providing an overhanging flange at one end of the container for fitting over the other end of such a container (which may in turn be of reduced cross-section in order to provide a recess for accommodating the flange). Such a connection would not normally be gas-tight and would be required to be sealed with a sealing compound such as a joint sealant available under the GORE-TEX trademark.

The attachment means extending along an upper side of the container are for attaching the membrane. Preferably, the membrane has a periphery of increased thickness, such as a bead. This may be provided by sewing a chain or rope into a peripheral seam and sealing any stitching holes. The bead preferably clips into the attachment means, which may be formed as a channel having a narrowed mouth. If necessary, the attachment means may also be sealed with a sealing compound.

BRIEF DESCRIPTION OF THE DRAWINGS

Embodiments of the present invention will now be described by way of example only with reference to the drawings wherein;

FIG. 4 is a schematic elevational view of a second embodiment which is a self-supporting vessel for storing grain;

FIG. 5 is a sectional view of the laminate of the vessel of FIG. 4;

FIG. 6 is a perspective view of a third embodiment of the invention;

FIG. 7 is a cross-section thereof.

FIG. 8 is a detailed view of the zip fastening; and

FIG. 9 shows the depletion of oxygen in grain stored in the enclosure of the invention.

DETAILED DESCRIPTION OF PREFERRED EMBODIMENTS

Figure 1:
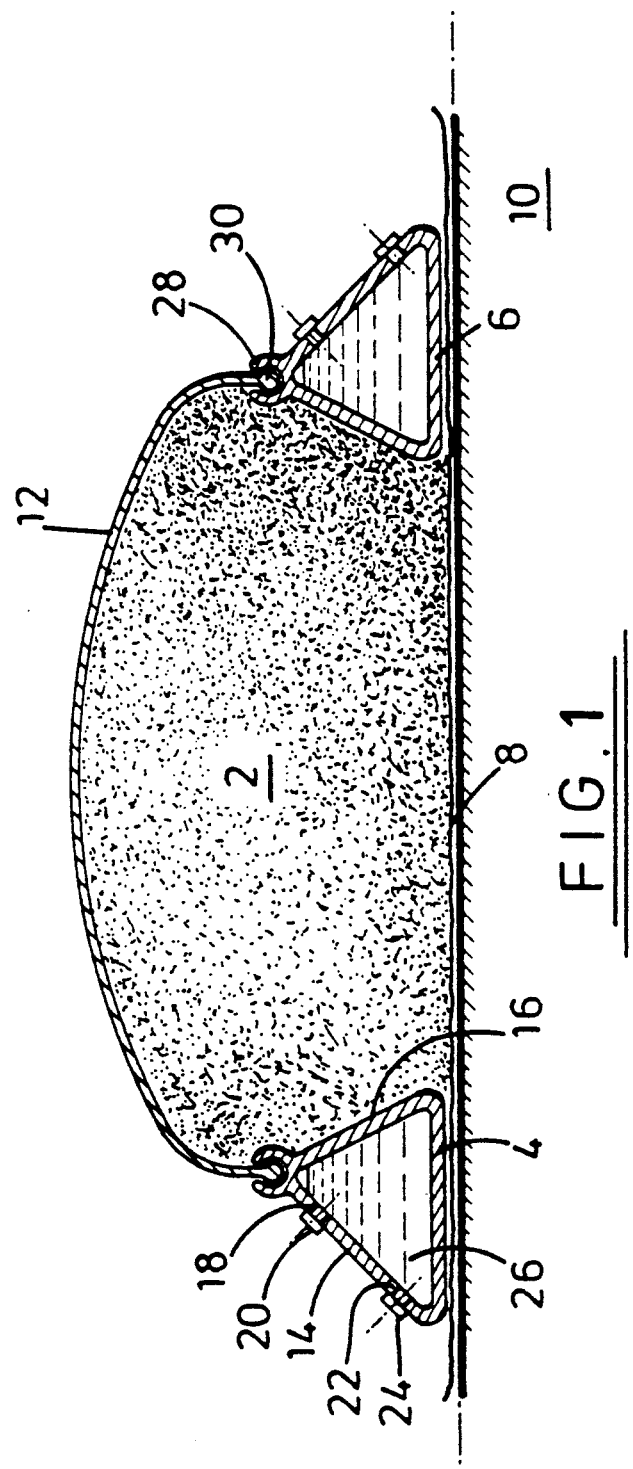
FIG. 1 is a schematic cross-sectional view of a store.

FIG. 1 shows a store for storing grain 2 comprising a pair of hollow wall elements 4, 6 located on a waterproof gas-impermeable ground sheet 8 placed on the ground 10. A water-vapour-permeable and gas-impermeable membrane 12 extends between the wall elements so as to form a closed gas-tight storage environment.

Each wall element is formed of a fibrous material, such as fibreglass or fibre board which has been impregnated with a resin, before being moulded and cured to give a rigid lightweight shape. Each wall element is of generally triangular configuration, the slopes on the sloping surfaces 14, 16 being the same or different in order to best provide a stable structure when full of grain. The interior surface 16 is smooth so that grain is not held up on the surface when the store is unloaded.

Each hollow wall element comprises an upper inlet 18 sealed with a stopper 20 and a lower outlet 22 closed by a stopper 24. The hollow internal space 26 is filled with water so as to weight the wall element once in place.

Figure 2:
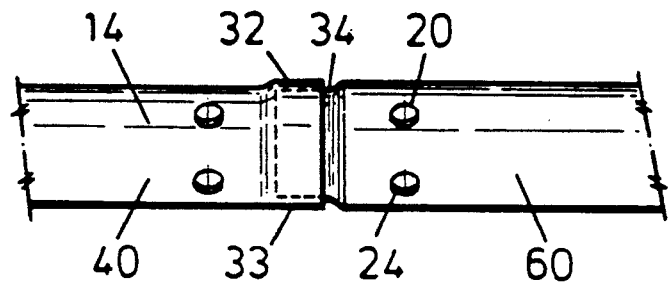
FIG. 2 is a detailed view showing the end-to-end connection of two wall elements.

Along the apex of each wall element is provided a channel 28 having a narrowed mouth for receiving a bead 30 provided around the periphery of membrane 12. The channel 28 allows the bead to be clipped in place, and may be formed from a resilient material such as extruded plastics, or a metal such as aluminium. The channel is integrated into the hollow container structure prior to resin impregnation, moulding and curing. FIG. 2 shows the manner in which two hollow wall elements 40, 60 are connected together end-to-end. One wall element 40 is provided with an overhanging flange 32 on the inclined surfaces 14, 16 and preferably also on the base 33. Into this is fitted a corresponding reduced diameter section 34 of the other wall element 60. The joint may be sealed in gas-tight manner using a sealant such as that available under the GORE-TEX trademark.

Figure 3:
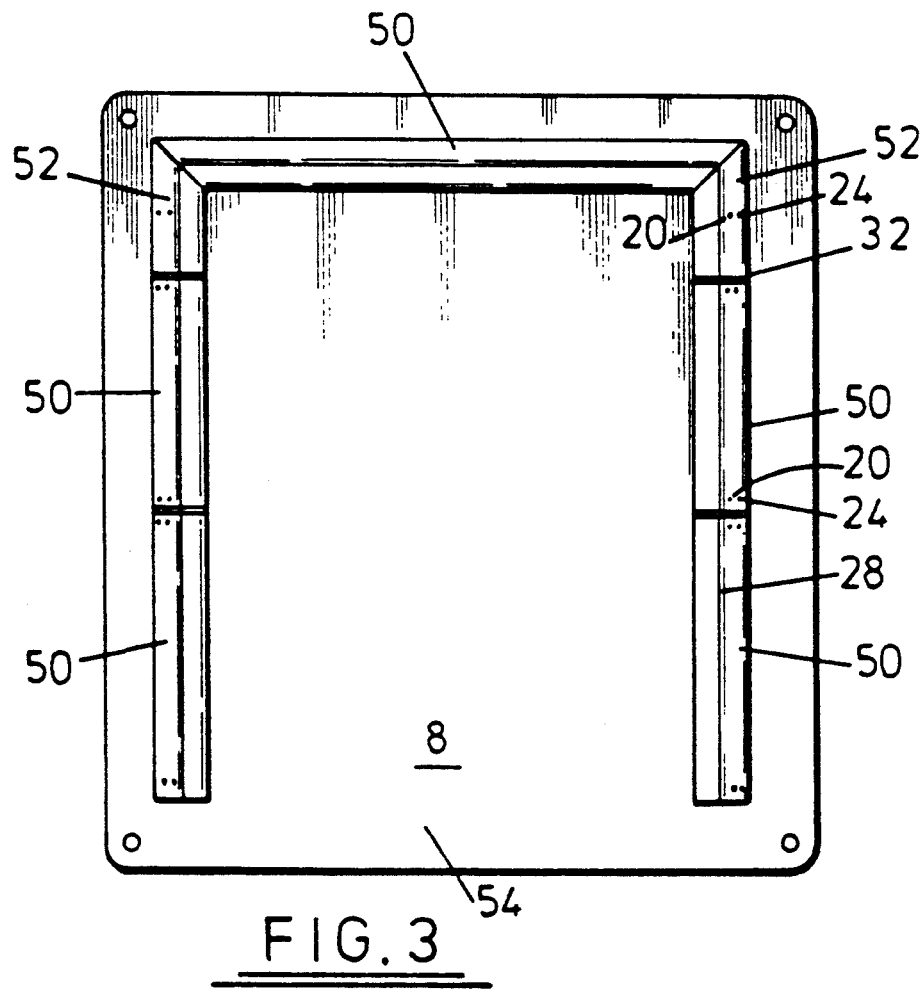
FIG. 3 is an elevational view of the store (with the membrane omitted).

FIG. 3 shows a three-sided wall formed of straight wall elements 50 and corner elements 52. A membrane 12 having a circumferential bead 28 is clipped into the channel 28 so as to form a storage environment having an entrance 54 for loading and unloading. The entrance 54 may be closed by simply bringing the membrane 12 down onto the ground sheet 8 and placing weights on top of it. Alternatively, a flat plate having a channel 28 may be placed across the entrance 54 and the bead of the membrane clipped into it.

The store may be provided as follows. Firstly, the groundsheet 8 is placed on level ground. A wall is created from the hollow wall elements, which are connected together at flanges 32 and sealed with a sealing compound. The top stopper 20 is removed from each wall element and each individual wall element is filled with water or sand, and the stopper replaced. Grain is then loaded into the enclosed area 8 until it forms a heap. The membrane 12 is then placed over the heap and the peripheral bead 30 is clipped into the channel 28 on the wall, and if necessary sealed with a sealant. The membrane is brought down onto the ground sheet 8 in the entrance area 54 and weighted down so as to be substantially gas-tight. If necessary, wall elements of reducing height may be provided on either side of the entrance 54 in order to provide a smooth transition for the membrane down to the groundsheet level. Grain may be removed from the store by unclipping and rolling back as much of the membrane as is required before replacing and resealing the membrane. The membrane is waterproof and keeps out the rain.

FIG. 4 shows a second embodiment. The storage vessel comprises an enclosure 62 of generally frustoconical shape formed of a water-vapour-permeable gas-impermeable membrane material and having a gas-sealable inlet 64 at the top thereof, and a sealable outlet 66 at the bottom. A pair of counterbalancing arms 68, 70 are provided on either side of the enclosure. The arms are fixed at their lower end to the ground and at their upper end are connected by means of ropes, chains etc. 72, 74 to the upper periphery of the enclosure for supporting the enclosure whilst it is being filled. Outlet chute 76 is provided with an auger 78 which is rotatable to transport the grain from the enclosure.

The two angles x and y are generally in the range 30° to 60° and are chosen to provide a stable enclosure construction, and which is bevelled enough to prevent rodents gaining any purchase with their teeth.

The enclosure 62 is formed of a membrane in the form of a flexible laminate, as shown in FIG. 5, of two layers 80, 82 of expanded porous PTFE, such as sold under the GORE-TEX trade mark, by W. L. Gore & Associates, Inc., one coated with a continuous oleophobic sublayer or coating 83. The layers 80, 82 are held together by means of a sublayer 84 of adhesive breathable compound 84, the adhesive compound being applied as a continuous layer or at spaced locations in order to provide strength in the transverse direction to the laminate. The adhesive is preferably produced as described in U.S. Pat. No. 4,532,316. The layers 80, 82 are water-impermeable and water-vapour-permeable and provide strength and durability to the enclosure 62, while the adhesive sublayers 83 and 84 constituted by the adhesive and oleophobic coating are water-vapour-permeable and gas-impermeable. The laminate had a water vapour transmission rate of 4000 g/m$^2$/day, a resistance to water vapour of 351 Sm$^{-1}$ and a resistance to oxygen of $3.34 \times 10^7$ Sm$^{-1}$. The ratio of water vapour resistance to oxygen resistance was $1.05 \times 10^{-5}$.

The vessel of FIG. 4 may be employed as follows. Firstly, the upper end of the empty vessel is raised and attached to the upper end of the counterbalancing arms. The inlet is open and the outlet is closed. The enclosure is then filled with grain from a conventional filling assembly until the enclosure is substantially full. If the grain is particularly damp, warm dry air may be blown upwards from the outlet to the inlet to provide an initial drying. The outlet and inlet are then sealed and any remaining moisture allowed to dry out naturally through the water vapour permeable membrane material. At this stage, the enclosure will normally contain ambient air having oxygen content of around 20%. Under such conditions, any insect pests within the grain proliferate. However, the pests gradually use up the oxygen so that the oxygen content is reduced to a low level. Below 10% oxygen, the proliferation of insect life becomes severely restricted, whilst below 2% oxygen an aerobic (i.e. oxygen requiring) life forms die off. If necessary, small amounts of insecticide may also be applied to the grain. Moreover, in order to accelerate oxygen depletion the enclosure may be purged with gas such as carbon dioxide or nitrogen.

In order to remove the grain from the vessel, the top of the enclosure may be disconnected from the counter balancing arms and the outlet opened, such that grain flows out under gravity and the flexible vessel collapses, without however allowing the ingress of further oxygen-containing air. In this way, the grain may be handled under conditions of minimised oxygen concentration.

FIGS. 6 and 7 show a third embodiment of the invention wherein the water-vapour-permeable membrane is zipped onto an impervious groundsheet.

Walls of the store are formed from sections 90 of zinc coated steel bent into a right angle and braced if necessary, so as to present an upstanding portion 92 and a horizontal portion 94. Typically each portion is approximately one meter square. An impervious rubber groundsheet 96 of Hyperlon forms the base and sides of the store, and is provided with pockets 98 along its sides and closed end which fit over the upper ends of the steel sections. A pair of zip halves 100,102 are provided along the upper edges 104,108 of the rubber groundsheet.

A water-vapour-permeable membrane 110 (as shown in FIG. 5) having corresponding zip halves 101, 103 is zipped onto the top of the upper edges of the groundsheet so as to form an enclosure. The zips form gas-tight seals.

FIG. 8 shows the zip arrangement in more detail. The zip half 103 is stitched to membrane 110 and the stitching seam is sealed by the application of porous expanded PTFE tape. The zip half 102 is bonded to the groundsheet sidewall. A thin rubber or fabric strip 112 is stitched and seam-taped to the underside of membrane 110 to protect the zip. Two zips are provided, each of which starts in the middle of end edge 108 and extends up a respective side 104 of the store.

The front end 112 of the enclosure is open and the side walls reduce in height towards the front to bring the front of the membrane down to ground level. Similarly the front of the groundsheet extends beyond the front of the sidewalls to lie beneath the front of the membrane. The open end of the enclosure is sealed by rolling up the front of the membrane and groundsheet together and applying weights thereon.

The enclosure is filled with grain (not shown) prior to attachment of the membrane 110. Grain can be removed by opening the front nd of the enclosure and resealing.

In conventional manner, a drying floor (not shown) may be provided within the enclosure to support the grain and to allow circulation of air within the enclosure. Fans and supply ducts may also be provided to assist drying of the grain. Generally air from within the enclosure is recirculated to avoid introducing fresh air with a higher oxygen concentration. Reverting to FIG. 7, recirculation is accomplished by means of fan 116 which causes air to be withdrawn through outlet duct 114 and to reenter through inlet duct 112, the ducts being located in the rear wall. For initial drying of wet grain, a membrane 110 may be employed which has high water-vapour-permeability (and consequently somewhat higher gas permeability). Once the grain has been subject to an initial drying to avoid mould growth, the membrane may be substituted with a further membrane of lower water-vapour-permeability and enhanced gas impermeability in order to allow reduction of oxygen concentration to the desired degree (typically 5-7%).

EXAMPLE 1

The following tests were undertaken at Ministry of Agriculture and Fisheries, C.S.L. Slough, U.K. Wheat initially at 13.7% or 17.7% moisture content was stored in experimental containers made of a test fabric according to FIG. 5. The quality of the wheat after 12 weeks was compared with the quality of wheat in similar control containers made of woven nylon. The wheat was purposely infested with *Tribolium castaneum* and after 12 weeks the insects in the control containers had multiplied and about 90% were alive. At the higher moisture, heating also occurred. Little, if any, reproduction was apparent in the experimental containers and most of the insects were dead after 12 weeks storage especially in the damper wheat. Oxygen levels in the experimental containers fell to about 4% in seven weeks in the drier wheat, and to about 2% in four weeks in the damper wheat, but then increased slowly. In the drier wheat insects were the main consumers of oxygen whereas in the damp wheat it was consumed by insects and moulds. The control containers remained at about ambient gas levels although oxygen fell slightly when heating occurred in the damper wheat. The containers were kept at 24° C. in a dry atmosphere and the wheat dried in all containers but not sufficiently to restrict mould growth in the damper wheat. Germination was unaffected in the drier wheat, but fell slightly in the damper wheat in the experimental and control containers.

Table 1 shows the effect of the reduced oxygen concentration on insect numbers in the wheat. The increase in numbers of insects in the controls is due to insect reproduction over the 12 week period.

Table 2 shows reduction in moisture content of the stored wheat.

FIG. 9 compares the reduction in oxygen concentration in the present experiment to the control.

TABLE 1

(insect numbers)
Numbers of adult *Tribolium Castaneum* recovered from dry/damp wheat after 12 weeks storage.

| Wheat | | Container No. | Live | Dead |
|---|---|---|---|---|
| a) | Dry wheat (control) | 1 | 363 | 22 |
| | | 2 | 285 | 22 |
| | | 3 | 382 | 20 |
| b) | Dry wheat | 7 | 26 | 141 |
| | | 8 | 11 | 55 |
| | | 9 | 15 | 37 |
| c) | Damp wheat (control) | 4 | 463 | 51 |
| | | 5 | 511 | 38 |
| | | 6 | 615 | 28 |
| d) | Damp wheat | 10 | 4 | 113 |
| | | 11 | 1 | 56 |
| | | 12 | 1 | 84 |

TABLE 2

(moisture content)
Means of moisture content determinations at the start of experiment and after 12 weeks storage.

| | Moisture content % | |
|---|---|---|
| Container No. | Initial | Final* |
| 1 (Control) | 13.7 | 12.1 |
| 2 (Control) | 13.5 | 12.4 |
| 3 (Control) | 13.9 | 12.4 |
| 4 (Control) | 17.7 | 14.7 |
| 5 (Control) | 17.6 | 14.9 |
| 6 (Control) | 17.7 | 14.6 |
| 7 | 13.6 | 11.6 |
| 8 | 13.6 | 12.6 |
| 9 | 13.7 | 12.5 |
| 10 | 17.7 | 13.5 |
| 11 | 17.7 | 13.7 |
| 12 | 17.7 | 14.7 |

*Means of determination taken at surface level (sample in mesh bag), top, below top, middle, side and bottom of wheat volume.

I claim:

1. A closed storage vessel for storing moisture-containing product in a controlled environment surrounded by an external atmosphere and for allowing said stored product to become dried by loss of moisture therefrom, which comprises:
   - a gas-impermeable enclosure for storing and drying the product, the enclosure comprising a membrane, said membrane being gas-impermeable such as to resist ingress of oxygen-containing gas from said surrounding external atmosphere, said membrane being water-vapour-permeable to enable passage of water-vapour from said product in the enclosure through said membrane such as to allow water-vapour to escape from the enclosure and to enable the product to be dried;
   - means for recirculating gas within the enclosure for assisting drying of the product; and
   - the enclosure having means for providing an upstanding wall and a sealable inlet for introducing the product.

2. A storage vessel according to claim 1 wherein the membrane comprises porous expanded polytetrafluoroethylene.

3. A storage vessel according to claim 2 wherein the membrane carries an oleophobic coating thereon.

4. A storage vessel according to claim 3 wherein the membrane comprises a further layer of porous expanded polytetrafluoroethylene adhered by a continuous adhesive layer to the oleophobic coating.

5. A storage vessel according to claim 1 wherein the wall means comprises a hollow wall element provided with a port for filling with weighting material.

6. A storage vessel according to claim 1 wherein the wall means comprises angle plates, each having an upstanding portion and a horizontal portion extending under the enclosure.

7. A storage vessel according to claim 1 which comprises an impermeable groundsheet, and wherein the membrane comprises a top portion of the enclosure.

8. A storage vessel according to claim 7 wherein the groundsheet extends up the walls of the enclosure and is sealingly attached to the membrane along the upper periphery of the wall means.

9. A storage vessel according to claim 1 wherein the water-vapour-permeability rate is 1500 to 35,000 g/m²/day.

10. A storage vessel according to claim 1 wherein the oxygen leakage rate is less than 0.05% per day.

11. A closed storage vessel for storing and drying perishable agricultural produce in which the vessel is located outdoors in the open atmosphere, which comprises:
   a waterproof gas-impermeable base on which produce can be loaded;
   a flexible membrane for covering said produce, said membrane being gas-impermeable to the extent that it prevents ingress of oxygen-containing gas from said surrounding external atmosphere, said membrane being water-vapour-permeable so as to enable passage of water-vapour from said produce in the enclosure through said membrane so as to allow the produce to be dried;
   means for recirculating gas within the enclosure for assisting drying of the produce;
   means for affixing said flexible membrane to said base in a waterproof, gas-impermeable manner.

12. The storage vessel of claim 11 wherein the membrane comprises porous expanded polytetrafluoroethylene.

13. The storage vessel of claim 12 wherein the membrane carries an oleophobic coating thereon.

14. The storage vessel of claim 11 wherein the agricultural produce is grain.

* * * * *